March 10, 1970     E. R. COCCO     3,500,293

CONNECTOR INCLUDING A VISUAL INDICATOR

Filed June 12, 1968     2 Sheets-Sheet 1

INVENTOR
E. R. COCCO
BY
ATTORNEY

United States Patent Office 3,500,293
Patented Mar. 10, 1970

3,500,293
CONNECTOR INCLUDING A VISUAL INDICATOR
Eugene R. Cocco, Baltimore, Md., assignor to Bell Telephone Laboratories, Incorporated, Murray Hill, N.J., a corporation of New York
Filed June 12, 1968, Ser. No. 736,491
Int. Cl. H01r 3/00; G01s 1/72
U.S. Cl. 339—113                                5 Claims

ABSTRACT OF THE DISCLOSURE

A lamp is incorporated into the flexible grommet of the plug of a plug-in cord for a telephone handset. The lamp is molded within a rigid transparent support that includes a dome portion and a base portion, and the major portion of the lamp resides within the dome portion while the grommet is molded about the base portion.

BACKGROUND OF THE INVENTION

This invention pertains to the field of communications and within that field to electrical devices for providing visual indications by the illumination of lamps therein, such devices being commonly referred to as visual indicators. The visual indicator of the present invention is intended for use with a connector that terminates the cord.

The incorporation of a visual indicator into a connector is known in the art, but in the past the visual indicator has for the most part been bulky. Consequently it has added significantly to the size of the connector. In addition, in the past the visual indicator has not made the most efficient utilization of the light source. The lamp has either been positioned in a cavity or it has been enclosed in a housing that impedes transmission of the light rays.

SUMMARY OF THE INVENTION

An object of this invention is to provide a connector visual indicator that is compact and uses the light source in an efficient manner.

This and other objects of this invention are achieved in a visual indicator that includes a rigid transparent support having a dome portion and a base portion. The dome portion encompasses and is in intimate contact with a substantial part of the surface of the lamp that serves as the light source for the indicator. The base portion underlies the dome portion and includes a grommet locking element and lead retaining element. The retaining element holds the leads of the lamp spaced apart from one another and has an orifice extending therethrough that accommodates the connector cord. One end of the retaining element includes means for joining the support to the connector.

A flexible grommet is disposed about the entire base portion of the support except for the connector joining means of the retaining element. The grommet is secured in place by the locking element of the base portion and the grommet has an orifice extending therethrough in registration with the orifice in the retaining element of the base portion. The cord is threaded through both orifices and into the connector, and the connector is joined to the support. Thus the visual indicator serves as the junction between the cord and the connector.

DESCRIPTION OF AN ILLUSTRATIVE EMBODIMENT

Figure 1:
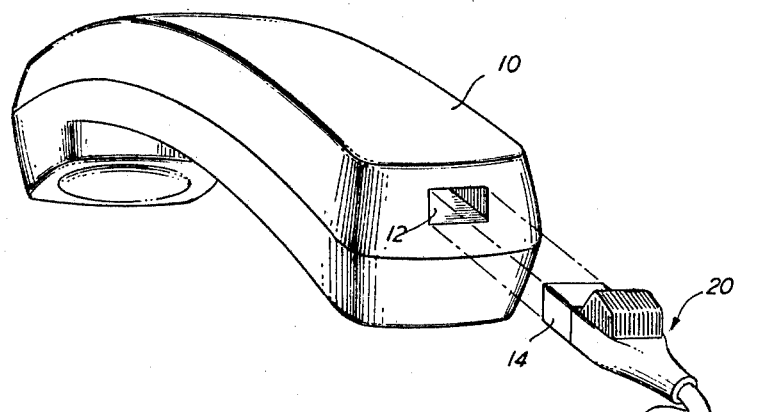
FIGURE 1 is a perspective view of the visual indicator of this invention joined with a connector terminated cord for a telephone handset.

Referring to FIG. 1 of the drawing, there is shown a telephone handset 10 having a socket 12 therein that accommodates a plug 14. The plug 14 terminates a cord 16 and a visual indicator 20 is joined to the plug at the juncture thereof with the cord.

Figure 2:
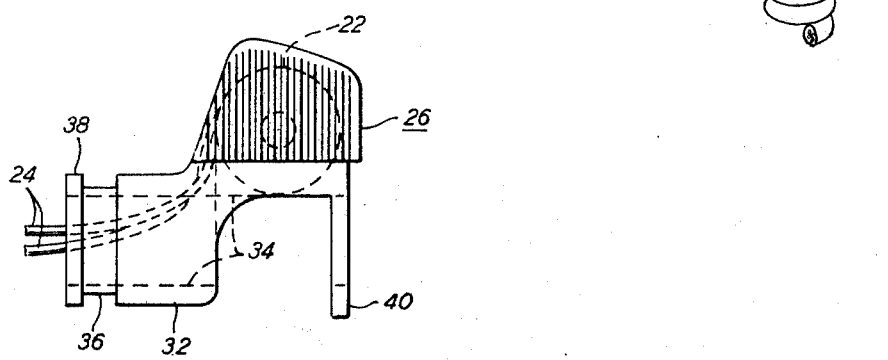
FIG. 2 is a side view of the support of the visual indicator with a lamp mounted therein.
Figure 3:
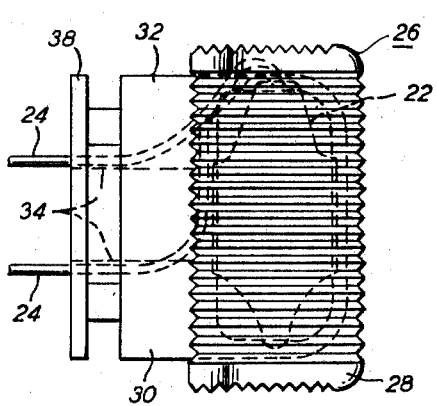
FIG. 3 is a top view of the support.
Figure 4:
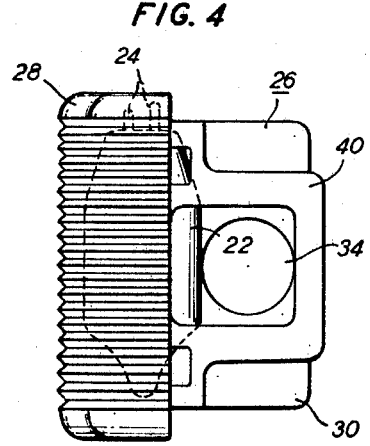
FIG. 4 is a front view of the support.

Turning to FIGS. 2, 3 and 4, the visual indicator 20 includes a lamp 22 having leads 24 and both the lamp and the leads are mounted within a rigid transparent dielectric support 26. Most of the lamp 22 is contained within a dome portion 28 of the support 26, and the surface of the dome portion is serrated to disperse the light emitted by the lamp, thereby enhancing the visibility of the lamp when it is illuminated. At the same time, the serrated surface of the dome portion 28 serves to decrease the visibility of the lamp 22 when it is not illuminated.

A base portion 30 of the support 26 underlies the dome portion 28, and the leads 24 of the lamp 22 are contained within a lead retaining element 32 of the base portion. The retaining element 32 has an orifice 34 extending axially therethrough and the leads 24 extend along opposite sides of the orifice, the ends of the leads extending out through one end of the retaining element. A circumferential groove 36 is formed in the surface of the retaining element 32 adjacent to this end, resulting in a flange 38 at the end. As hereinafter described, the groove 36 and flange 38 provide the means for joining the support 26 to the plug 14 (FIG. 1).

The base portion 30 of the support 26 also has a grommet locking element 40 comprising a wall that circumscribes the part of the lamp 22 not contained within the dome portion 28. The wall is spaced from the lamp 22 to provide cavities therebetween and the wall has several openings therein. The wall also has a depending lip opposite to the orifice 34 in the retaining element 32 the lip having an enlarged opening in alignment with the orifice.

The support 26 is advantageously a unitary member that is molded about the lamp 22 using a material such as clear polymethyl methacrylate.

Figure 5:
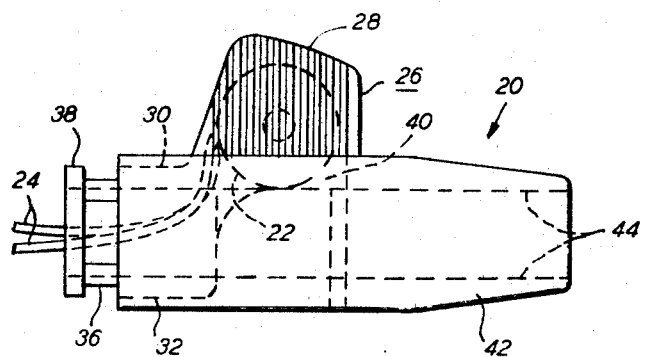
FIG. 5 is the same as FIG. 2 with the addition of the grommet of the visual indicator.

Turning now to FIG. 5, the visual indicator 20 further includes a flexible opaque grommet 42 that is disposed about the base portion 30 of the support 26 exclusive of the groove 36 and flange 38 of the retaining element 32. The grommet 42 extends beyond the other end of the base portion 30 and this end of the grommet tapers to a cylinder. In addition, the grommet 42 has an orifice 44 extending therethrough that is in registration with the orifice 34 in the base portion 30.

The grommet 42 encompasses the retaining element 32 and extends both through the openings in the wall of the locking element 40 and within the cavities between the wall and the lamp 22. Consequently once the grommet 42 is so disposed it is secured against both lateral and axial displacement. The grommet 42 is advantageously molded about the support 26 using material such as poly vinyl chloride.

Figure 6:
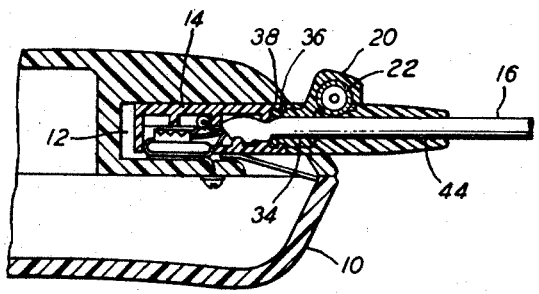
FIG. 6 is a sectional view showing how the visual indicator is joined with the cord and the connector.

As shown in FIG. 6, the orifice 44 in the grommet 42 and the orifice 34 in the base portion 30 of the support 26 accommodate the cord 16 which extends through the orifices and into the interior of the plug 14. Inside the plug 14 the individual conductors contained within the cord 16 are connected to the contacts of the plug and to the leads 24 (not shown) of the lamp 22. The plug 14 is secured to the visual indicator 20 by means of a groove and flange that respectively embrace the flange 38 and groove 36 of the visual indicator.

Although a specific embodiment of the invention has been shown and described, it will be understood that it is but illustrative and that various modifications may be made therein without departing from the scope and spirit of this invention.

What is claimed is:

1. A visual indicator for use with a connector terminating a cord having a plurality of conductors, the indicator comprising:
   a lamp having a pair of leads;
   a rigid transparent support disposed about the lamp, the support including
      a dome encompassing and in intimate contact with a substantial portion of the surface of the lamp, and
      a base underlying the dome, the base including a grommet locking element and a lead retaining element, the retaining element holding the lamp leads spaced apart from one another and having an orifice extending therethrough that accommodates the cord, and one end of the retaining element including means for joining the support to the connector; and
   a flexible grommet disposed about the base exclusive of the connector joining means of the retaining element, the grommet being secured in place by the locking element and having an orifice extending therethrough in registration with the orifice in the retaining element.

2. A visual indicator as in claim 1 wherein the support is a unitary member that is molded about a lamp.

3. A visual indicator as in claim 2 wherein the support is a dielectric member.

4. A visual indicator as in claim 1 wherein the means for joining the support to the connector comprises a circumferential groove formed in the surface of the retaining element adjacent to one end and a flange at the end.

5. A visual indicator as in claim 1 wherein the locking element comprises a wall that circumscribes part of the lamp, the wall being spaced from the lamp to provide cavities therebetween and the wall having several openings therein.

References Cited

UNITED STATES PATENTS

| | | | |
|---|---|---|---|
| 2,265,846 | 12/1941 | Krantz | 339—147 X |
| 2,474,407 | 6/1949 | Todd et al. | 339—113 X |
| 2,503,677 | 4/1950 | McHenry et al. | 339—113 X |
| 2,701,867 | 2/1955 | Obenschain et al. | 339—91 X |

RICHARD E. MOORE, Primary Examiner

U.S. Cl. X.R.

240—2.17; 339—147